(No Model.) 3 Sheets—Sheet 1.
J. E. ATWOOD.
MACHINE FOR REELING SILK, &c.
No. 296,378. Patented Apr. 8, 1884.
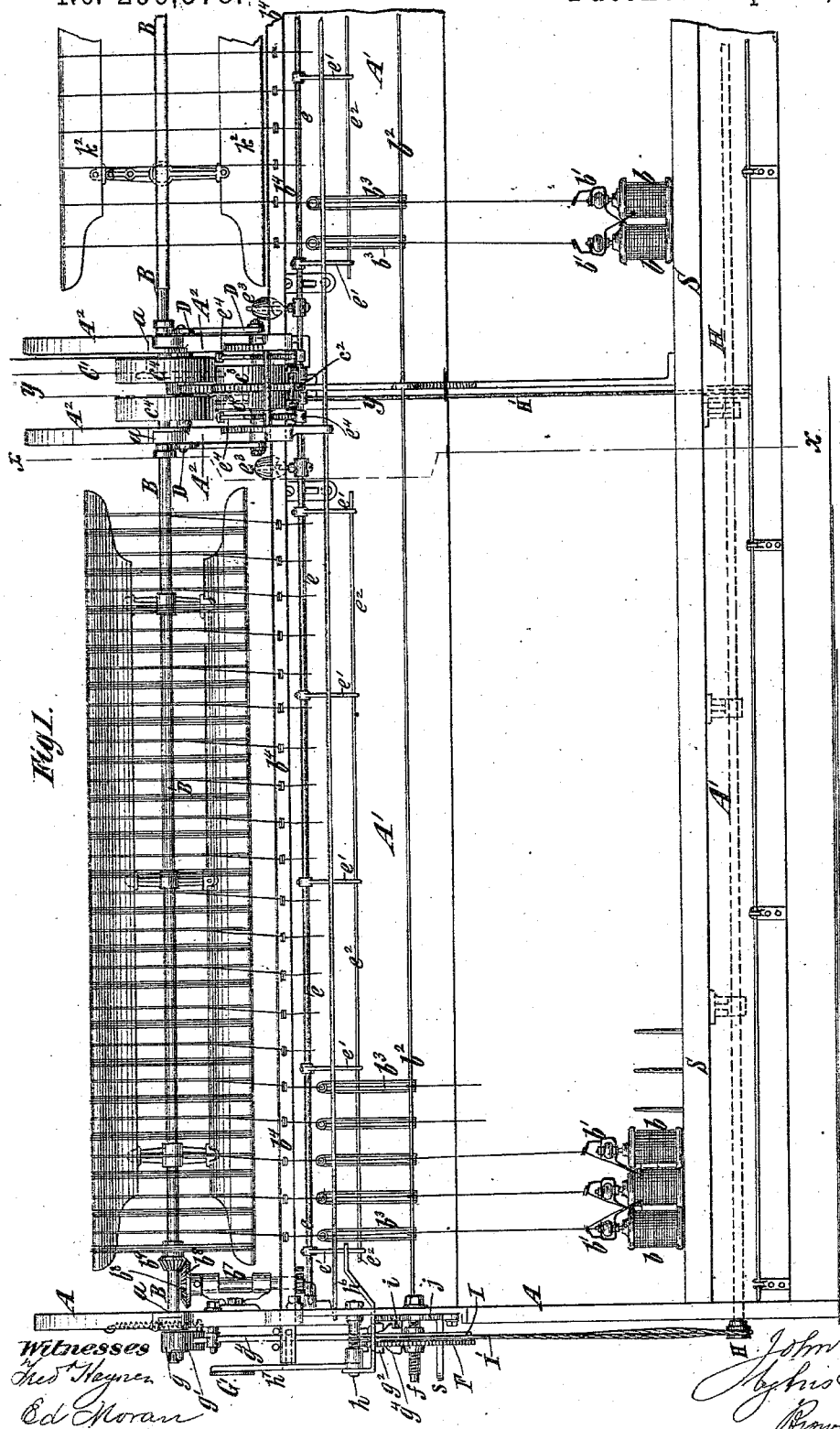

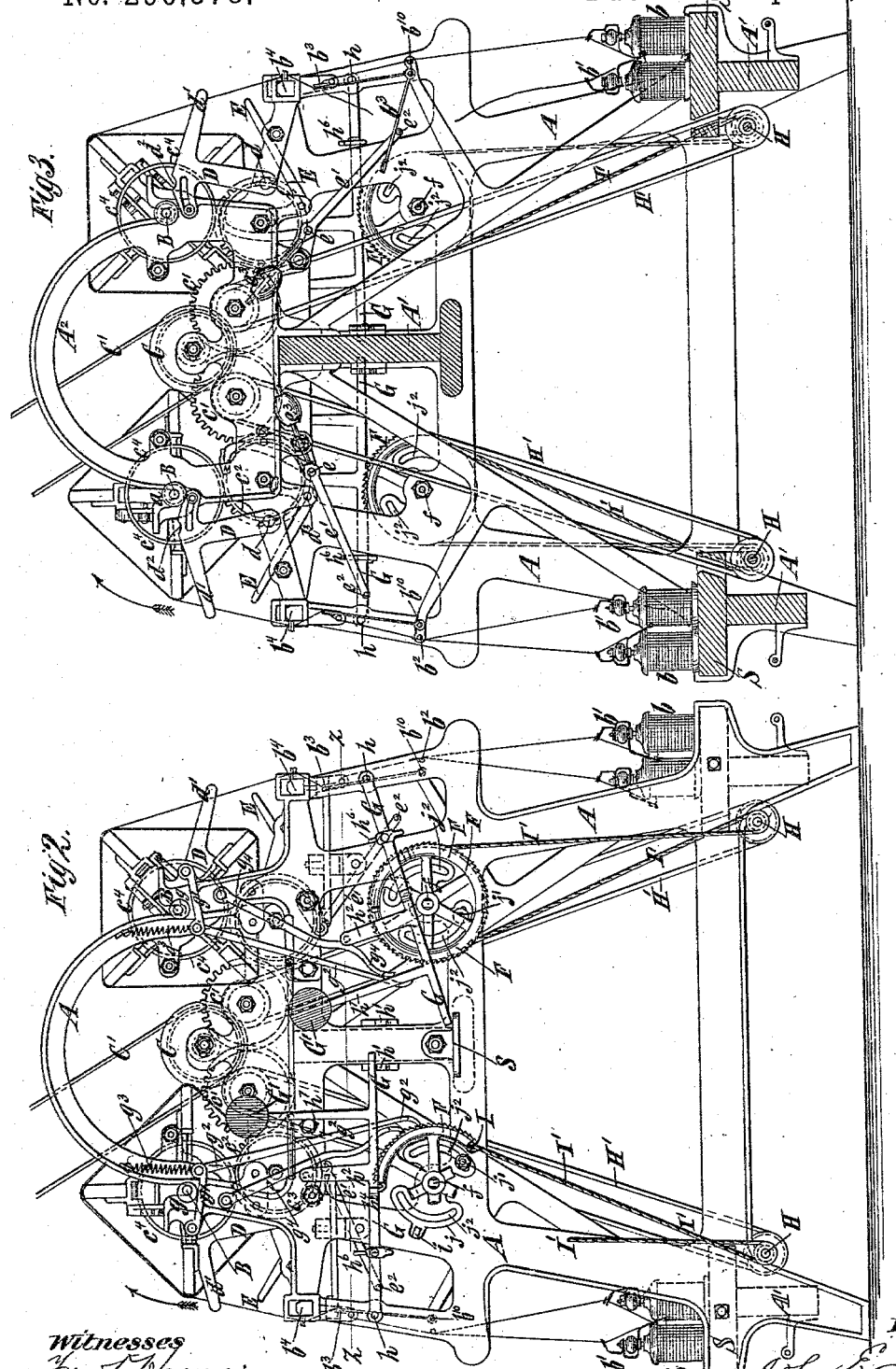

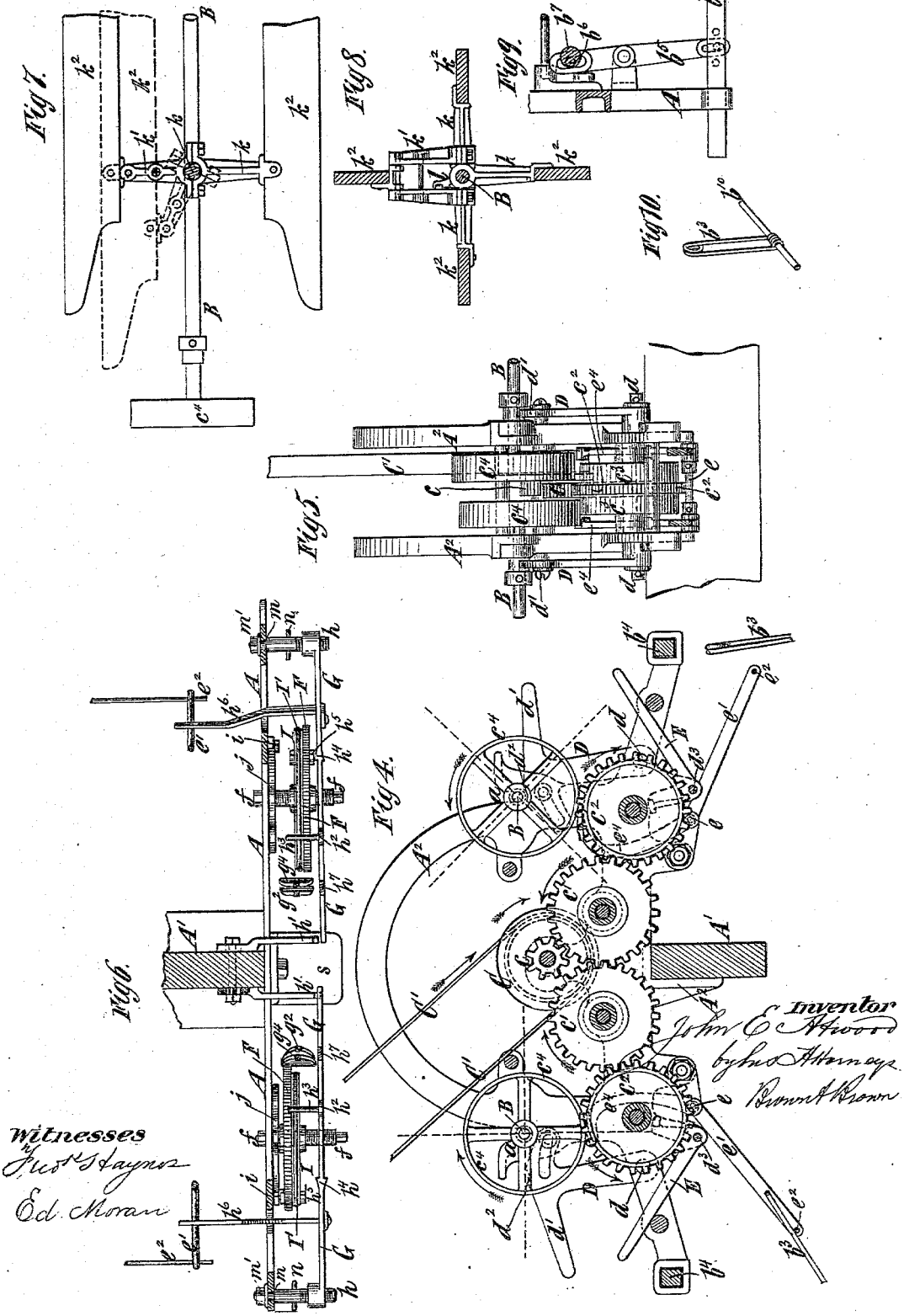

UNITED STATES PATENT OFFICE.

JOHN E. ATWOOD, OF STONINGTON, CONNECTICUT.

MACHINE FOR REELING SILK, &c.

SPECIFICATION forming part of Letters Patent No. 296,378, dated April 8, 1884.

Application filed February 27, 1882. (No model.)

*To all whom it may concern:*

Be it known that I, JOHN E. ATWOOD, of Stonington, in the county of New London and State of Connecticut, have invented certain new and useful Improvements in Machines for Reeling Silk, &c., of which the following is a specification.

My invention is applicable to machines for reeling fibrous materials of various kinds, and particularly to machines for reeling what is known in silk manufacture as "organzine."

An important object of my invention is to combine four reels in one frame or machine without couplings, so that any one of them may be stopped without necessitating the stopping of any of the others, and so that each may be readily removed and replaced by another when full and ready for steaming, drying, and removing the fibrous material from it.

To this end my invention consists in the combination of two pairs of reel-shafts, the shafts of each pair being arranged side by side and in line with the shafts of the other pair, friction-wheels upon the adjacent inner ends of the several shafts, friction driving-wheels on which the friction-wheels of the shafts rest, means for raising any one of the reel-shafts independently of the others, so as to carry its friction-wheel out of contact with its friction driving-wheel, a driving-pulley arranged between the two pairs of shafts and midway between the shafts of each pair, and mechanism for transmitting motion from said driving-pulley to the several friction driving-wheels, all as more fully hereinafter described.

The invention also consists in the combination, with one or more reels and a separate stop-motion for each reel, for raising the wheel on the reel-shaft out of contact with the driving wheel or drum, of a separate rotary counter or trip for each reel and a drop-lever for each reel, which is acted upon by the counter or trip when a sufficient quantity of material is wound on the reel to which it appertains, and which acts upon the stop-motion to stop the reel.

The invention also consists in the combination, with a reel and its stop-motion, of a counting device which operates through said stop-motion to stop the reel when a sufficient quantity of material is wound thereon, and a target or indicator operated by the counting device, and adapted to show at a glance by its position whether the stoppage of the reel is caused by the desired amount of material being wound on the reel or not. I also combine with each rotary counter a trip, means for returning it to its starting-point against a stop, and for adjusting said stop at will, so as to allow the counter or trip to rotate for a longer or shorter time before it trips the drop-lever and stops the reel, whereby I provide for varying within narrow limits the quantity of material to be wound on the reel before it is stopped automatically.

The invention also consists in a novel combination of parts whereby I am enabled to adjust the drop-levers outward from or inward toward the rotary counters, so that the counters will be allowed to make a greater or less number of turns before they trip the drop-levers, and provision for greatly varying the amount of material to be wound on the reel is afforded.

The invention also consists in various novel details of construction and combinations of parts, to be hereinafter described and claimed.

In the accompanying drawings, Figure 1 represents a side elevation of the principal portion of a machine embodying the various features of my invention, and showing the entire length of one reel and the adjacent end portion of the reel in line therewith. Fig. 2 represents an end view of the machine with certain portions broken away to show the parts behind them. Fig. 3 represents a vertical transverse section upon the plane of the dotted line $x\,x$, Fig. 1. Fig. 4 represents a transverse vertical section of the upper part of the machine upon the plane of the dotted line $y\,y$, Fig. 1, and upon a larger scale. Fig. 5 represents a side view of the parts shown in Fig. 4 upon the same scale. Fig. 6 represents a horizontal section of one of the end frames of the machine upon the dotted line $z\,z$, Fig. 2, and a plan view of the rotary counters, stops, or trips and their appurtenances, all upon a larger scale than in Fig. 2. Fig. 7 represents a side view of one end portion of a reel of my improved construction. Fig. 8 represents a transverse section thereof. Fig. 9 represents a detail plan view of certain mechanism for reciprocating the traverse bars of the machine, but which forms no part of my invention; and Fig. 10 represents a perspective view of one of the drop-wires on a larger scale.

Similar letters of reference designate corresponding parts in all the figures.

A designates the two end frames of the machine, and A' the longitudinal portions of the frame, which extend between and connect the end frames.

At about the middle of the length of the machine are two frames, $A^2$, which are supported upon the upper longitudinal bar or stretcher, A'.

B designates the reel-shafts, which are arranged in two pairs, the reels of each pair being arranged side by side and in line with the reels of the opposite pair, as shown in Fig. 1. Each reel-shaft is entirely independent of all the others, and they are supported in open bearings $a$ in the end frames, A, and intermediate frames, $A^2$, so that they can be readily removed and replaced by others when they are full.

It is desirable to have two sets of reels to each machine, in order that one set of reels may be used in reeling while the skeins wound on the other set are being steamed, dried, and removed from the reel.

The two end frames, A, and the two intermediate frames, $A^2$, have arched or rounded tops, as clearly shown in Figs. 2, 3, and 4, and the rounded or arched portions serve as guards to aid in guiding and directing the reel-shafts B into their open bearings $a$.

S designates the supports upon which the spools or bobbins $b$ are supported in two rows in zigzag relation to each other, so as to secure a compact arrangement, and from each set of spools or bobbins the threads or fibers are conducted through fliers $b'$, over rods $b^2$, through drop-wires $b^3$, through eyes upon the traverse-bar $b^4$, and then to the reel. The traverse-bar $b^4$ of each reel is operated in an ordinary way by means of a horizontal vibrating lever, $b^5$, which is shown in Fig. 9, and which is actuated by a cam, $b^6$, upon a vertical shaft, $b^7$, which is rotated by a gear-wheel, $b^8$, and pinion $b^9$ on the reel-shaft. Each reel-shaft B should have a pinion, $b^9$, upon it for engaging with the wheels $b^8$ when the reels are placed in the machine.

Before describing particularly the mechanism for driving the reels, I would remark that it is of such a nature that any one of the reels will be stopped automatically when full or when a thread breaks, or by hand when desired for any purpose, while all the other reels are in operation, and without interfering with the other reels in any way. All the reels are operated by a driving mechanism arranged between the two intermediate frames, $A^2$, and best shown in Figs. 4 and 5, but also in Figs. 1, 2, and 3; and the shafts of the several wheels of this driving mechanism extend between and rotate in bearings in said frames.

C designates a driving-pulley, to which a constant rotary motion is imparted by a belt, C', and $c$ designates a pinion on the same shaft as said pulley.

On opposite sides of and below the driving-pulley C are gear-wheels $c'$, which intermesh, and will therefore rotate in reverse directions, and motion is imparted to them both by the pinion $c$ engaging with one of them.

On the outside of each wheel $c'$, and engaging therewith, is a second gear-wheel, $c^2$, and each wheel $c^2$ is interposed between and fast to two frictional driving-wheels, $c^3$, which rotate with it. The gear-wheel $c^2$ and wheels $c^3$ may be made in one piece, or permanently connected together, and they are rotated continuously in the direction of the arrows in Fig. 4.

Upon the ends of each of the reel-shafts B is a wheel, $c^4$, which rests upon one of the driving-wheels $c^3$, and when the reel-shafts are not raised the wheels $c^4$ rest upon the driving-wheels $c^3$, and are rotated by frictional contact therewith. When the inner end of any one of the reel-shafts B is raised sufficiently to take its wheel $c^4$ out of contact with the adjacent wheel $c^3$, the rotation of that reel is stopped, while all the others continue in operation.

It is sometimes desirable to stop one of the reels for one purpose or another, and to provide for this I employ a lever, D, for each reel, the form of which is shown clearly in Figs. 3 and 4. These levers are fulcrumed at $d$ to the frame $A^2$, and their upper edges are eccentric to the pivots and move under the reel-shafts, while their outwardly-projecting arms $d'$ form handles whereby they may be moved inward. In their upper edges the levers are formed with depressions or cavities $d^2$, and when one of them is moved inward it acts upon the reel-shaft and raises it so as to move its wheel $c^4$ out of contact with the wheel $c^3$, where it is held by the shaft resting in the cavity or depression $d^2$ until the lever is drawn back. Below each reel is arranged a drop-wire frame, which is composed of a fulcrum shaft or bar, $e$, arms $e'$, projecting outward therefrom, and a rod, $e^2$, connecting the ends of said arms. The drop-wire frames of the reels are in line with each other, as are the reels; but each frame is separate from and independent of the others, and is adapted to rotate without interfering with the others.

To the fulcrum shaft or rod $e$ of each frame is attached a balance-weight, $e^3$, which may be adjusted to accurately counterbalance the frame, and the said shaft or rod $e$ is preferably supported upon knife-edge bearings, so that it vibrates under a very slight impulse.

Upon the inner end of the fulcrum shaft or rod $e$ of each drop-wire frame, and beneath the wheel $c^4$ on the reel-shaft, is a lever, $e^4$, which has a sector-like and eccentric face, and if the frame vibrates downward the lever $e^4$ is carried against the face of the wheel $c^4$, as shown in Fig. 1, and in the left-hand lever in Fig. 4, and by the rotation of said wheel the said lever is drawn in under it, and raises it out of contact with the driving-wheel $c^3$, thus stopping the reel.

The drop-wires $b^3$ on each side of the machine are all supported upon a rod, $d^{10}$, on which they may turn, and when any one of the threads breaks or runs out its drop-wire falls upon the rod $e^2$ of the drop-wire frame, and thereby tilts or vibrates the frame, so as to cause its lever $e^4$ to raise the wheel $c^4$ on the reel-shaft out of contact with the driving-wheel $c^3$. When it is desired to again start the reel, it is done by means of a lever, E, which is pivoted at $d^3$, and when swung inward acts upon the sector-faced lever $e^4$. The arrangement of the levers E is clearly shown in Fig. 4, and also in Figs. 2 and 3.

The drop-wires $b^3$ may be of any suitable form; but in order to prevent the threads from escaping from them and snarling up, I prefer to make them of a piece of wire coiled at about the middle of its length to form an eye for the reception of the thread, and the two portions of the wire extend parallel with each other to the rod $b^{10}$, around which they are coiled. The form of the drop-wire is shown clearly in Fig. 10.

I will now describe the rotary counters, stops, or trips, which stop the rotation of the reels when the required amount of material is wound upon them, and which are best shown in Figs. 1, 2, and 6. These rotary counters, stops, or trips consist of ratchet-wheels F, two of which are mounted at each end of the machine, outside the end frame, A, and are screwed upon screw-threaded studs or journals $f$, projecting from the said end frame, as shown in Fig. 6, and having one a right and the other a left hand thread; hence when the wheels F are turned they are moved longitudinally along the studs $f$ in one direction or the other.

Upon the end of each reel-shaft B is a small cam, $g$, which at each rotation of the reel depresses a small lever, $g'$, pivoted at one end to the frame A, and carrying at the free end a drive-pawl, $g^2$, which engages with the ratchet-wheel F and moves it forward a tooth at each rotation of the reel. The lever $g'$ is returned after each depression by a spring, $g^3$, (shown in Fig. 2,) and the ratchet-wheel is prevented from moving backward by a stop-pawl, $g^4$.

G designates drop-levers which are arranged outside the wheels F, and which are pivoted at their outer ends by screw-threaded studs $h$ to the frame A, while their inner ends rest in their normal position on rests or supports $h'$.

Upon each lever G is an upwardly-projecting arm, $h^2$, carrying an inwardly-projecting pin, $h^3$, (shown in Fig. 6,) and upon each lever is a projection, $h^4$, the face of which is inclined, as clearly shown in Fig. 6, while upon the front side of the wheel F is a projection, $h^5$. The drop-levers G also carry arms $h^6$, which project inward through the frame A and over the adjacent arms $e'$ of the drop-wire frame, as shown in Figs. 1 and 6. While reeling, the inner ends of the levers G rest upon the rests or supports $h'$, and as the reels become filled the ratchet-wheels F are advanced toward the outer ends of their screw-threaded studs or journals $f$ by the action of the drive-pawl $g^2$. When the wheel F approaches the end of its stud $f$, as is the case with the right-hand wheel in Fig. 6, its projection $h^5$ bears against the inclined projection $h^4$ on the lever and springs the lever outward, so that its inner end is pushed off the rest or support $h'$ and the lever falls, bringing its projecting arm $h^6$ down upon the arm $e'$ of the drop-wire frame, and thereby moving the sector-faced lever $e^4$ into contact with the wheel $c^4$ on the reel-shaft B, and moving the said wheel out of contact with the driving-wheel $c^3$, thereby stopping the reel. When the drop-levers G fall, their inner ends are arrested by a stop or rest, $s$, (shown clearly in Fig. 2,) and the levers are thereby held so that the pins $h^3$ hold the pawls $g^2$ and $g^4$ out of engagement with the ratchet-wheels F.

Upon the drop-levers G are upwardly-projecting arms, $h^7$, which carry targets G', consisting of colored disks or other indicators, and when the drop-levers fall the fact is made clearly apparent by the changed position of the targets or indicators G'. If one of the reels stops, the attendant glances to see the position of the targets or indicators, and if one of them is down he knows that the reel is stopped because the skeins are wound to the desired size. If the targets or indicators are all in proper position, the attendant knows instantly that the stoppage is caused by the breakage or running out of one of the threads. After one of the rotary counters, stops, or trips has tripped or thrown off the drop-lever G, it must be turned back upon its stud $f$ to the starting-point.

H designates shafts, of which one is arranged on each side of the machine, and these shafts are rotated by means of belts H', driving from pulleys upon the shafts of the wheels $c'$.

Attached permanently to each of the ratchet-wheels F is a pulley, I, and the said pulleys are connected with the shafts H by means of crossed belts I'. These belts tend to turn the wheels F in the opposite direction to that in which the pawls $g^2$ turn them; but the belts are slack enough so as to slip upon the pulleys when the ratchet-wheels are being advanced by the said pawls. When the drop-lever G of any reel falls, the inwardly-projecting pin $h^3$ bears against the stop-pawl $g^4$ and raises both the pawls out of engagement with the wheel F, whereupon it is free to be reversed in motion, and is screwed back upon the stud $f$ by the belt I'. The wheel F is turned back until a projection on its inner side strikes against a stop, $i$, which prevents it from moving farther back, and forms a starting-point, from which the forward rotation of the wheel commences. The stop $i$ is upon a plate, $j$, which fits loosely upon the stud $f$, and which is held in place, after adjustment, by a clamping-bolt, $j'$, fitting a curved slot, $j^2$, in the plate. By turning the plate $j$, the stop $i$ is shifted so as to allow the wheel F to turn back more or less before striking it, and by thus shifting the projecting stop by adjusting the plate $j$ the amount of material which may be wound on the reel before it is automatically stopped may be varied at pleasure, and the exact amount of material in each skein is regulated, and may be varied as may desired. The adjustment of the slotted plates $j$, however, only provides for varying to a limited extent the quantity of material which may be wound on the reel before it is stopped automatically; and to enable the quantity to be varied within wide limits, I provide for shifting the drop-levers G outward away from the frame A. In this example of my invention the studs $h$, upon which the levers G are fulcrumed, are screwed onto the levers, and they are provided, on opposite sides of the frame A, with a shoulder, $m$, and a nut, $m'$, as shown in Fig. 6, which provide for clamping them to the frame. By loosening the nut $m'$, the stud is left free to turn, and by turning it by hand in one or the other direction, which may be done by a pin, $n$, inserted through it, the lever G will be moved toward or from the frame A, and the rotary counter F will be free to make a greater or less number of turns before its projection $h^5$ strikes the projection $h^4$ on the lever G and trips said lever. The same adjustment of the drop-levers might be provided for in other ways—as, for instance, by having the studs fit loosely in the levers, and screwed into the frame A, where they may be rigidly clamped by a jam-nut. In either construction the rests $h'$, for the free ends of the levers, should be adjustable outward and inward, and this may be provided for by slotting the holes in said rests through which the bolts pass by securing said rests to the frames, as shown in dotted lines in Fig. 6. When the drop-levers G are again raised and supported upon their rests or supports, the pawls $g^2$ $g^4$ again engage with the wheels F, and the latter are rotated again until the rotary counters or trip-wheels F knock off the levers G, as above described.

Any form or construction of reel may be employed; but I prefer to use a reel of the kind shown clearly in Figs. 7 and 8, because of the facility with which the skeins of material may be removed from the reel. The reel-shaft B has arms $k$ $k'$ projecting from it, and carrying the longitudinal bars $k^2$, on which the material is wound. Three of the arms $k$ project rigidly from the shaft, and have the bars $k^2$ rigidly bolted to them; but the third arm, $k'$, is pivoted to the arms $k$, and is also pivoted to the bar $k^2$. When the reel is in use, the bar $k^2$, which is pivoted to the arm $k'$, occupies the position shown in full lines in Fig. 7; but when the skeins are to be removed the arm $k'$ is swung to one side, as indicated in dotted lines, to draw its bar inward, so that the skeins may be removed without difficulty. When the arm $k'$ is swung back into position for use, it strikes against a stop, $l$, which prevents the arm from moving past a position in the same plane with the arms $k$. It will be understood that there is a similar arrangement of arms $k$ $k'$ at each end of the reel.

It will be seen that not only is the driving mechanism located between the two pairs of reels, but said mechanism is located midway in a longitudinal direction between the reels of each pair.

By my invention I provide a machine in which the four reels, although they are operated by a common driving mechanism, are each separate from and independent of each other, and are capable of being stopped, started, removed, and replaced separately and without interfering with each other.

What I claim as my invention, and desire to secure by Letters Patent, is—

1. The combination of the two pairs of reel-shafts B, the shafts of each pair being arranged side by side and in line with the shafts of the other pair, friction-wheels $c^4$ upon the adjacent inner ends of said shafts, with friction driving-wheels $c^3$, on which the wheels $c^4$ rest, means for raising any one of the reel-shafts independently of the others, to carry its wheels $c^4$ out of contact with its driving-wheel $c^3$, a driving-pulley, C, arranged between the pairs of shafts and midway between the shafts of each pair, and mechanism for transmitting motion from this pulley C to all of the friction driving-wheels $c^3$, all substantially as and for the purpose specified.

2. The combination of the two pairs of reel-shafts B, provided with friction-wheels $c^4$, and arranged, as herein described, with two friction driving-wheels, $c^3$, and an interposed gear-wheel, $c^2$, connected together and arranged below the shafts, which are in line on each side of the machine, the friction-wheels $c^4$ of the reel-shafts resting on the friction driving-wheels $c^3$, the hand-levers D, whereby any one of said reel-shafts may be raised independently of the others to carry its wheel $c^4$ out of contact with its friction driving-wheel $c^3$, the single driving-pulley C and pinion $c$, and the gear-wheels $c'$, for transmitting motion from the pinion $c$ to the interposed gear-wheels $c^2$, all substantially as specified.

3. The combination, with the rod $b^{10}$, of the drop-wires $b^3$, each composed of a single piece coiled at about the middle of its length to form an eye, and having two parallel portions extending from said eye to and coiled around said rod $b^{10}$, substantially as herein described.

4. The combination, with one or more reels and driving mechanism therefor, of a separate stop-motion for each reel, a rotary counter or trip for each reel, and a separate drop-lever adapted to be released by said counter or trip and to act upon the stop-motion to stop the reels, substantially as herein described.

5. The combination, with a reel and a stop-motion for automatically stopping the same when a thread breaks or runs out, of a counting device which operates through said stop-motion to stop the reel when a sufficient quantity of material is wound thereon, and a target or indicator operated by the counting device, and adapted to show by its position whether the stoppage of the reel is due to a sufficient quantity of material being wound thereon or to a thread breaking or running out, substantially as herein described.

6. The combination, with one or more reels, driving mechanism therefor, and independent stop-motions, of a separate rotary counter or trip and a separate drop-lever for each reel, mechanism for advancing the counters with a step-by-step motion, and mechanism for turning the counter or counters backward when released, substantially as herein described.

7. The combination, with the two pairs of reels and their common driving mechanism, of separate stop-motions for the several reels, the ratchet-wheel counters F and their attached pulleys I, the belts I' and means for driving them, the screw-threaded studs $f$, the drive-pawls $g^2$, and the drop-levers G, having pins $h^3$, and adapted to act upon the stop-motions to stop any one of the reels, substantially as herein described.

8. The combination, with two pairs of reels and their common interposed driving mechanism, of separate stop-motions for the several reels, the ratchet-wheel counters F, their attached pulleys I, belts I' and means for driving said belts, the screw-threaded studs $f$, the drive-pawls $g^2$, the drop-levers G, having pins $h^3$, and adapted to act on the several stop-motions, and the adjustable stops for arresting the backward movement of said counters F, substantially as herein described.

9. The combination, with a rotary counter, F, of a drop-lever, G, fulcrumed at one end, and a rest, $h'$, for supporting the free end of said lever, substantially as specified.

10. The combination, with a rotary counter, F, of a drop-lever, G, fulcrumed at one end, a rest, $h'$, for supporting the free end of said lever, and a stop, $s$, for arresting said lever in its fall, substantially as specified.

11. The combination, with a rotary counter, F, of a drop-lever, G, a fulcrum stud or pin, $h$, providing for the adjustment of said lever toward and from said counter, and a rest, $h'$, for supporting the free end of said lever, and also adjustable, substantially as specified.

12. The combination, with the frame A and a rotary counter, F, of a drop-lever, G, a fulcrum-stud, $h$, screwed into said lever and adapted to be turned in said frame, and an adjustable rest, $h'$, for supporting the free end of said lever, substantially as specified.

JOHN E. ATWOOD.

Witnesses:
E. E. BRADLEY,
WM. A. GILBERT.